2,922,156
Patented Jan. 19, 1960

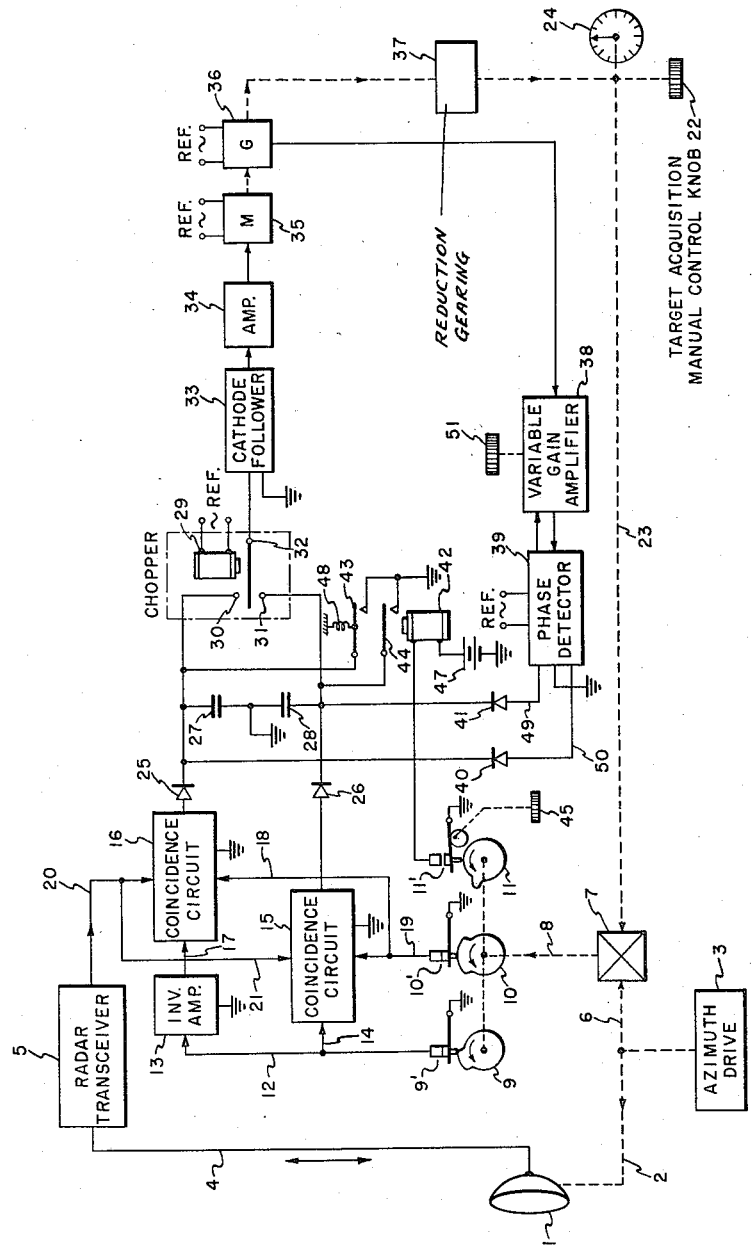

2,922,156

AUTOMATIC TRACK-WHILE-SCAN SYSTEM

Lloyed R. Kimball, Plainview, N.Y., assignor to Sperry Rand Corporation, a corporation of Delaware Application January 31, 1957, Serial No. 637,592

8 Claims. (Cl. 343—7.3)

The present invention relates to improvements in automatic tracking systems operating from grouped data. More particularly, it concerns a novel azimuth tracker for a track-while-scan radar system.

A known method for tracking a selected target automatically in azimuth while the radar is scanning through 360° involves the use of early and late gates for the video signal which operate one immediately after the other over a small selectively positionable sector of the scan, say for example, 20°. This small sector is initially positioned to embrace the target by means of a manual or automatic target acquisition control, but not necessarily in a centrally embracing manner, for it is the function of the automatic tracker to centralize the gated sector on the target and to thereafter maintain it centralized. To realize this function in a pulse type radar system, for example, the number of video pulses obtained while the early gate is "on" is generally compared with the number of these pulses obtained while the late gate is "on." For such comparison, the early gate pulses are sometimes stored in one integrating capacitor and the late gate pulses in another integrating capacitor, and some suitable arrangement is employed to obtain an error signal according to the difference between the charges accumulated in the respective capacitors. A servo-motor energized by this error signal drives a suitable mechanism for repositioning the gated sector toward that position whereat the next group of received pulses is evenly divided between the early and late gates, assuming that there has been no appreciable change in the relative positions of the target and the site of the radar. A recycling arrangement operates just before the arrival of this next pulse group so as to discharge the charges stored on the capacitors from the preceding scan.

If the time between successive scans or "looks" of the radar at the target is short compared to the response of the servomechanism that adjusts the gates relative to the antenna, the servo does not have an opportunity to fully centralize the gates before a subsequent pulse group from the target is received. Accordingly, after a number of scans, each one resulting in a discrete adjustment to the gates, the gates eventually are adjusted to evenly straddle the target, and are controlled automatically to remain so disposed.

There are many times, however, when it would be more desirable to effect an automatic adjustment to the gates in a sufficiently rapid manner that substantially full gate centralization occurs following merely one sweep of the antenna across the selected target. In the usual arrangement just described, more rapid tracking could be obtained by increasing the gain of the gate adjusting servo loop. However, since the loop is opened during a large portion of the antenna scanning revolution due to the de-activation of the early and late gates, the gate-adjusting motor continues to be energized according to the stored error information up to the time recycling takes place for the radar's next look at the target. Then, even though the new error may be zero, the inertia of the gate-adjusting motor may nevertheless produce an overshoot resulting in a finite error of opposite sense relative to the original error. Succeeding target signals would cause succeeding reversals of motor rotation in an attempt to maintain the error at zero. To prevent such oscillation, lower gain would appear to be required, resulting in a slower tracking response which in turn would tend to return the system to the first point from which departure was made to accelerate its tracking rate.

It is the general object of the present invention to provide an improved automatic tracking servomechanism for a track-while-scan radar.

Another object is to provide a radar automatic tracking servomechanism characterized by high stability and adapted to achieve rapid tracking.

An additional object is to accomplish centralization of early and late tracking gates about a target azimuth in response to grouped target data in a time interval less than the period of said grouped data.

Yet another object is to provide a dual servo loop automatic tracking servomechanism including a first loop which is intermittently closed during reception of grouped target data and a second loop which is continuously closed by means of integrated rate feedback.

A further object is to provide a dual servo loop automatic tracking servomechanism wherein the response of the first loop is relatively slow as compared to that of the second loop.

These and other objects of the present invention, as will appear from the following description, are accomplished by the provision of a dual servo loop automatic tracking servomechanism, said servo loops including certain common components. The first servo loop is closed only during the time interval wherein target pulses are being received. A second servo loop is continuously closed by means of integrated rate feedback.

In the first servo loop, received target pulses are applied to first and second integrating means in accordance with the relative time displacement between the occurrence of early and late gates and the occurrence of target pulses. The difference in voltage between said two integrating means is applied as an error signal to a servo motor to adjust the time of occurrence of the early and late gates in such a direction so as to centralize said gates in time about the occurrence of the target pulses.

The response of the first servo loop is slow relative to the period of the grouped target pulses.

The foregoing integrating means, error signal derivation means, and servo motor are common to the first and second servo loops. In the second servo loop, however, the output of a rate generator, driven by the gate adjusting servo motor, is employed to equalize the charges that have accrued on each of the integrating means from one group of target pulses. This equalization is completed in each instance before the arrival of a succeeding group of target pulses.

In this manner, the gate-adjusting servo motor is stopped, without oscillation, at substantially the precise position required to properly centralize the early and late gates about the target. Thus, by referring to a suitably calibrated indicator linked to the servo motor shaft, the last known azimuth, for example, of the target may be accurately noted utilizing information obtained from only one scan of the antenna across the target provided that the original angular displacement between a first point on said shaft, corresponding to the center of the early and late gates, and a second point thereon, corresponding to the target azimuth, is no more than one half the antenna azimuth beam width. That is, the maximum rate at which the early and late gates are centralized about the target azimuth is equal to one half the antenna azimuth beam width per 360-degree scan period.

For a more complete understanding of the present invention, reference should be had to the following description and the sole figure which is a block diagram, partly schematic, of a preferred embodiment of the present invention.

Referring to the drawing, a directional antenna 1 is mounted to rotate through 360° for azimuth scanning, and is driven at a substantially constant scanning rate via a linkage 2 from an azimuth drive unit 3. Radio frequency pulses for target illumination, occurring at a given pulse repetition rate, are fed to the antenna via a transmission line 4 from the transmitter portion of a radar transceiver 5. Reflected pulses received by the antenna are fed via transmission line 4 to the receiver portion of transceiver 5 where they are converted into video pulses. Antenna 1 and transceiver 5 are conventional pulse radar elements. In this regard, provision is made in transmission line 4 or the transceiver, by use of a T-R box or the like, for substantially preventing the high intensity pulses delivered by the transmitter portion from passing directly to the receiver portion, but permitting the passage of reflected pulses to the receiver portion.

Linkage 2 is coupled by a connection 6 to one input side of a mechanical differential 7 whose output side is drivably connected via a linkage 8 to three cams 9, 10, and 11. Each of the cams has associated therewith a pair of contacts, respectively 9', 10', and 11', one contact of each contact pair being connected to ground.

The other contact of contact pair 9' is connected via a lead 12 to an inverter amplifier 13 and via a lead 14, branching from lead 12, to a triple-coincidence circuit 15. A like triple-coincidence circuit 16 receives the output of inverter amplifier 13 via a lead 17 and is also connected to the other contact of contact pair 10' via a lead 18 branching from a lead 19 which connects this contact to circuit 15. Video signals from transceiver 5 are fed to circuit 16 via a lead 20 and to circuit 15 via a lead 21 branching from lead 20.

The triple-coincidence circuits 15, 16 are electronic gates each of which produces an output when, and only when, three conditions for it are satisfied. Three such conditions for circuit 15 to produce an output in the illustrative embodiment of the drawing, are that leads 12, 14 must be grounded (contacts 9' closed), lead 19 must be grounded (contacts 10' closed), and video signals must be present on leads 20, 21. Similarly, for circuit 16 to produce an output, lead 17 must be substantially at ground potential (contacts 9' opened), leads 19, 18 must be grounded (contacts 10' closed), and video signals must be present on lead 20. The opening of contacts 9' places lead 17 substantially at ground potential due to the presence of direct coupled inverter amplifier 13. The circuitry of the inverter amplifier is arranged in a well-known manner so that when contacts 9' are closed, grounding the lead 12, the amplifier produces an output on lead 17 which prevents gate circuit 16 from opening even though leads 19, 18 are grounded and video is present on lead 20. But when contacts 9' are opened to remove the ground from lead 12, the inverter amplifier returns lead 17 substantially to ground potential so that gate circuit 16 will then open, providing that leads 19, 18 are grounded and video is present on lead 20. Thus, the effect of inverter amplifier 13 is to ground the lead 17 when lead 12 is ungrounded, and vice-versa.

While there are many well-known ways in which a satisfactory triple-coincidence circuit may be made, each of the present circuits 15, 16 preferably employs a multigrid tube such as, for example, the type 6AS6, developed specifically as a multigrid switch. Thus, by way of illustration, the closing of contacts 9' may remove a cut-off bias from the suppressor grid of a switch tube in circuit 15, while the closing of contacts 10' may remove a cut-off bias from the screen grid of this tube. Video pulses arriving on the control grid in time coincidence with the removal of both cut-off biases are then substantially duplicated in the output of the tube.

The raised portion of cam 10 is adjusted in degrees, relative to the remaining circumference thereof, to represent some convenient total azimuth sector to be embraced by the early and late gates. For example, the raised portion of cam 10 may be adjusted to 20°. On this basis the raised portion of cam 9 is adjusted to be 10°. Assuming a counter-clockwise rotation of cams 9 and 10 as indicated, the left hand raised edges of cams 9 and 10 are aligned to occur at a common angle.

Thus, when the left hand edges of cams 9 and 10 raise their respective lower contacts of contact pairs 9' and 10', leads 19, 12 and 14 are grounded. Said leads remain simultaneously grounded until the 10° raised surface of cam 9 has been traversed whereupon contacts 9' open and contact 10' remain closed. Upon 10° additional rotation of said cam, contacts 10' also open. By this arrangement, the two conditions required for the triple-coincidence circuit 15 to produce output pulses in response to input video pulses are satisfied over a 10° sector of antenna rotation which is immediately followed by a 10° sector of antenna rotation wherein the two conditions required for the triple-coincidence circuit 16 to similarly respond are satisfied. Thus, circuit 15 provides an early gate of 10° width for the video signal, while circuit 16 provides a late gate of 10° width, the width of the sector occupied by the two gates being 20°.

In order that the early-late gates may be selectively positioned so that their successive occurrence takes place when the antenna is pointing in the general direction of the target to be tracked, a manual control knob 22 is provided, the knob being drivably connected via a linkage 23 to the other input side of mechanical differential 7. A pointer driven by knob 22 and linkage 23 cooperates with a dial 24 which is calibrated to indicate the exact position in the antenna's revolution to which the midpoint of the gated sector is adjusted by manipulation of the knob, i.e. the point where the early gate stops and the late gate begins. Thus, for example, if the present system is installed on an aircraft, the dial may be calibrated so that the pointer indicates the number of degrees displaced from dead ahead that the sector midpoint occurs in the antenna scan, whereby the relative bearing of the target is indicated when the sector midpoint has been adjusted to occur at the particular point in the antenna's scan where the directional axis of the antenna intersects the target.

For a given radar pulse repetition rate, antenna azimuth beam width and azimuth scanning rate of said antenna, a predetermined number of received pulses may be predicted for a single scan of the radar beam across a single target. Assuming, for example, that twenty pulses will be received in a single scan and that the early and late gates are symmetrically displaced about the target azimuth, the first ten received pulses will pass through the early gate while the remaining ten pulses will pass through the late gate. Under such a condition, ten pulses will be passed through to coincidence circuit 15 and isolating diode 26 to condenser 28. Similarly, the remaining ten pulses appearing at the output of coincidence circuit 16 will be passed through isolating diode 25 to condenser 27.

The resulting charges appearing across condensers 27 and 28 will be proportional to the number of pulses applied thereto, as is well known in the art. The voltage appearing across condenser 27 is applied to terminal 30 of chopper 29 and the voltage appearing across condenser 28 is applied to terminal 31 thereof. There will appear at armature terminal 32 of relay 29 a square wave of voltage having an amplitude proportional to the difference between the potential of charged condensers 27 and 28 and having a phase relative to the reference voltage applied to the coil of chopper 29 indicative of the polarity of potential difference of condensers 27 and 28.

The resulting square wave at armature terminal 32 is coupled to amplifier 34 via cathode follower 33. The output of amplifier 34 is applied as a signal input to A.C. motor 35. Amplifier 34 includes a low-pass filter so that only the fundamental component of the square wave output of cathode follower 33 is applied to motor 35.

Motor 35 will turn in a direction determined by the phase of the amplified fundamental frequency component of the square wave output of chopper 29. The shaft of motor 35 is drivingly coupled to drap-cup generator 36 in turn producing an output voltage at the frequency of the applied reference source having a zero or 180° relationship therewith determined by the direction of rotation of the shaft of motor 35 and having an amplitude proportional to the speed of said rotation. The electrical signal output of generator 36 is applied to variable gain amplifier 38 whose push-pull output in turn is applied to the signal input of phase detector 39. Phase detector 39, for example, may comprise a pair of triode vacuum tubes whose common plate to cathode voltage is supplied by the reference source, the grid of each tube having a respective one of the push-pull outputs of amplifier 38 applied thereto.

Inasmuch as the electrical signal output of generator 36 will have either 0° or 180° phase relationship relative to the reference source, as previously described, either one of the two triodes comprising phase detector 39 will conduct the conducting triode being that one wherein the grid-to-cathode and plate-to-cathode alternating voltages are in phase. Leads 49 and 50 are associated with a respective cathode circuit of said triodes so that output pulses from the conducting triode will be passed by the isolating diode associated therewith.

The output leads from isolating diodes 40 and 41 are applied to condensers 27 and 28 so that the output from the conductive triode of phase detector 39 will be applied to that one of condensers 27 and 28 having the lesser charge.

Thus, by the action of a minor servo loop comprising condensers 27 and 28, chopper 29, cathode follower 33, amplifier 34, motor 35, generator 36, amplifier 38, and phase detector 39, the charge on that one of condensers 27 and 28 having the lesser original charge is increased until the difference in potential between said condensers is reduced to zero. At that point, the control signal input of motor 35 falls to zero and said minor servo loop is stabilized.

Once for each revolution of ganged cams 9, 10 and 11, the raised portion of cam 11 causes contact 11' to close thereby energizing the coil of relay 42 by means of current source 47. In the case of the assumed counterclockwise rotation of said cams, contacts 11' are caused to close just prior to the closing of contacts 9' and 10'. Upon the closing of contacts 11' and the energizing of relay 42, contacts 43 and 44 (normally held open by the action of the restraining means 48) are closed to rapidly discharge condensers 27 and 28 so that they will be prepared to receive the next pulse outputs of coincidence circuits 16 and 15.

As mentioned previously, the early and late gates are manually positioned to approximately straddle the target azimuth so as to initially cause some target video pulses to pass through the early and late gates. This manual positioning of the early and late gates is accomplished by means of control knob 22. It should be noted, however, that the rotation of control knob 22 causes rotation of the shaft of generator 36 through reduction gearing 37. With a reference voltage continuously applied to generator 36, an output votlage is produced therefrom and impressed upon the input of amplifier 38 by the mere positioning of control knob 22.

To preclude the possibility that an output from generator 36, caused by the positioning of control knob 22, would inadvertently place a charge on either of condensers 27 and 28, control knob 45 is provided as a means of closing contacts 11' simultaneously with the manual adjustment of control knob 22. Thus, to effect the repositioning of the early and late gates, knob 45 is first turned to close contacts 11' to discharge condensers 27 and 28 as previously discussed. Subsequent to the manual closing of contacts 11', control knob 22 may be adjusted at will without producing any charge on either of the now shorted condensers 27 and 28.

As previously described, the original charges on condensers 27 and 28 are distributed in accordance with the relative azimuth displacement between that of the early and late gates and that of the target. This is accomplished by the action of the major servo loop comprised of coincidence circuits 15 and 16, condensers 27 and 28, chopper 29, cathode follower 33, amplifier 34, motor 35, reduction gearing 37, differential 7, and early and late gate cams 9 and 10. In the major servo loop, the mechanical shaft output of motor 35 is coupled via reduction gearing 37 to the phasing input of differential 7 to adjust the displacement of shaft 8, relative to that of shaft 6, to eventually position early and late gate cams 9 and 10 so that equal charges will be developed across condensers 27 and 28.

From one point of view, therefore, the present invention embodies a major and a minor servo loop having certain common component portions, the major loop having a response slow with respect to the period of input data, while the minor servo loop has a relatively fast response with respect thereto.

The purpose of reduction gearing 37 is to enhance the operation of both the major and minor loops. In the major loop, gearing 37 isolates differential 7 from motor 35 to the extent that any torques imposed on shaft 23 by the action of differential 7 in reponse to the drag of shaft 8 (caused by friction, for example, between cams 9, 10, and 11 and their respective followers) are divided in magnitude by the gear ratio. Consequently, a smaller motor 35 may be used to drive the cam load through differential 7 than would be reqiured in the absence of gearing 37.

As to the minor loop, gearing 37 allows for higher speed of rotation of generator 36 (for a given rotation of shaft 23 to phase cams 9, 10 and 11) resulting in increased output of generator 36 whereby the signal-to-noise ratio of the voltage applied to amplifier 38 is increased.

It is apparent from the preceding description that in its operation, the minor servo loop must be calibrated so that the cancellation of the differential charge between condensers 27 and 28 occurs at the precise moment that cams 9 and 10 are properly positioned to centralize about the target azimuth as defined by the initial differential charge between said condensers.

To effect such calibration, the gain of amplifier 38 may be manually adjusted by means of control knob 51 in the following manner. For a given radar repetition rate, antenna azimuth beam width and scanning rate of said antenna, the differential number of pulses applied to condensers 27 and 28 will correspond to a given azimuth angle of error defining the deviation of the center of the early and late gates from the target azimuth. For example, let it be assumed that a differential pulse count of 10 corresponds to an azimuth error of 1°. Thus, upon the feeding of ten simulated target pulses into one of the condensers, say condenser 28, the gain of amplifier 38 may be adjusted so that cams 9, 10, and 11 will be rotated through 1° in precisely the same time interval that the adjustable amplitude pulses out of phase detector 39 will charge condenser 27 to the same voltage as produced by the application of the assumed ten pulses to condenser 28. Once this initial calibration is effected, the automatic azimuth tracker of the present invention may be placed into reliable operation for a given radar repetition rate, antenna azimuth beam width, and azimuth scanning rate.

From the preceding description it can be seen that the objects of the present invention have been achieved through the provision of an automatic azimuth tracker for a track-while scan radar, the azimuth tracker comprising a major and a minor servo loop. The major servo loop is sluggishly responsive, relative to the period of the incoming groups of target pulses, and is closed only during the time interval that the groups of target pulses are received. The minor servo loop is quickly responsive, relative to the period of the incoming groups of target pulses, and is continuously closed by means of integrated rate feedback so applied to early and late gate integrating means that the voltage across the integrating means having the lesser original charge is made equal to the voltage across the integrating means having the greater initial charge. The apparatus of the present invention operates to position the early and late gates of an automatic tracking servo mechanism at the last known target azimuth within a time interval less than the period of said groups of target pulses and without oscillation of the early and late gates about the target azimuth.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a track-while scan radar, automatic target tracking means comprising a receiver of target pulses, adjustable early and late gate generating means, first and second integrating means, first and second coincidence means each adapted to receive the received target pulses and operatively connected to a respective one of said gate generating means whereby to direct said target pulses to said first and second integrating means in accordance with the relative time displacement between the occurrence of said target pulses and the operation of said coincidence means, each of said integrating means producing a first signal having a characteristic proportional to the number of target pulses directed thereto, means connected to both said first and second integrating means for generating an error signal having an amplitude and sense representing the algebraic difference between the characteristics of said first signals, means for integrating said error signal to produce a control signal for the adjustment of said early and late gate generating means in a sense tending to equalize the characterisics of said first signals, means for differentiating said control signal to produce a feedback signal having a sense corresponding to that of said error signal, and means responsive to the sense of said feedback signal for selectively coupling said feedback signal to that one of said first and second integrating means receiving the lesser number of target pulses.

2. In a radar system, automatic tracking means adapted to receive the pulse outputs of early and late tracking gates, said apparatus comprising first and second servo means each of which includes a first and second integrating means respectively adapted to receive the pulse outputs of a corresponding one of said early and late gates, each integrating means producing a first signal having a characteristic proportional to the number of pulses received thereby, means connected to both said first and second integrating means for generating an error signal having an amplitude and sense representing the algebraic difference between the characteristics of said first signals, means for integrating said error signal to produce a control signal, said first servo means further including early and late gate adjusting means actuated by said control signal and said second servo means further including means for differentiating said control signal to produce a feedback signal having a sense corresponding to that of said error signal, and means responsive to the sense of said feedback signal for selectively coupling said feedback signal to that one of said first and second integrating means receiving the lesser number of said pulses.

3. Apparatus as defined in claim 2 wherein said apparatus further includes means for resetting said first and second integrating means, said means for resetting being synchronously but not simultaneously actuated with the operation of said early and late gates.

4. Apparatus as defined in claim 2 wherein said apparatus further includes means for initially setting said early and late gate adjusting means.

5. Apparatus as defined in claim 2 wherein said means for selectively coupling includes a variable gain device.

6. A servomechanism adapted to respond to successive groups of pulse signals and operative to divide each of said groups into two subgroups of equal numbers of pulses, said servomechanism comprising a first and second successively actuatable and adjustable coincidence means, each adapted to receive said groups of signals, said second means being actuated within a time interval following the actuation of said first means which is less than the time interval separating the pulses in each of said groups, whereby each of said means individually passes said pulses occurring simultaneously with the time of said respective actuation, first and second integrating means adapted to receive said individually passed pulses from a respective one of said first and second coincidence means and operative to produce respectively first and second signals, each having a characteristic related to the number of said pulses received, means connected to both said first and second integrating means for generating an error signal having an amplitude and sense representing the algebraic difference between the characteristics of said first and second signals, means for integrating said error signal to produce a control signal for actuating both said coincidence means in a sense tending to equalize the characteristics of said first and second signals, means for applying said control signal to both said coincidence means, means for differentiating said control signal to produce a feedback signal having a sense corresponding to that of said error signal and means responsive to the sense of said feedback signal for selectively coupling said feedback signal to that one of said first and second integrating means receiving the lesser number of pulses.

7. Apparatus as defined in claim 6 wherein said first and second integrating means are each a capacitor.

8. Apparatus as defined in claim 6 wherein said third integrating means is an electric motor and said differentiating means is an electric generator.

References Cited in the file of this patent

UNITED STATES PATENTS 2,628,349     Nightenhelser     Feb. 10, 1953